Nov. 5, 1957
M. A. PROVI
2,812,422
ILLUMINATED BATHROOM SCALE
Original Filed Dec. 28, 1953
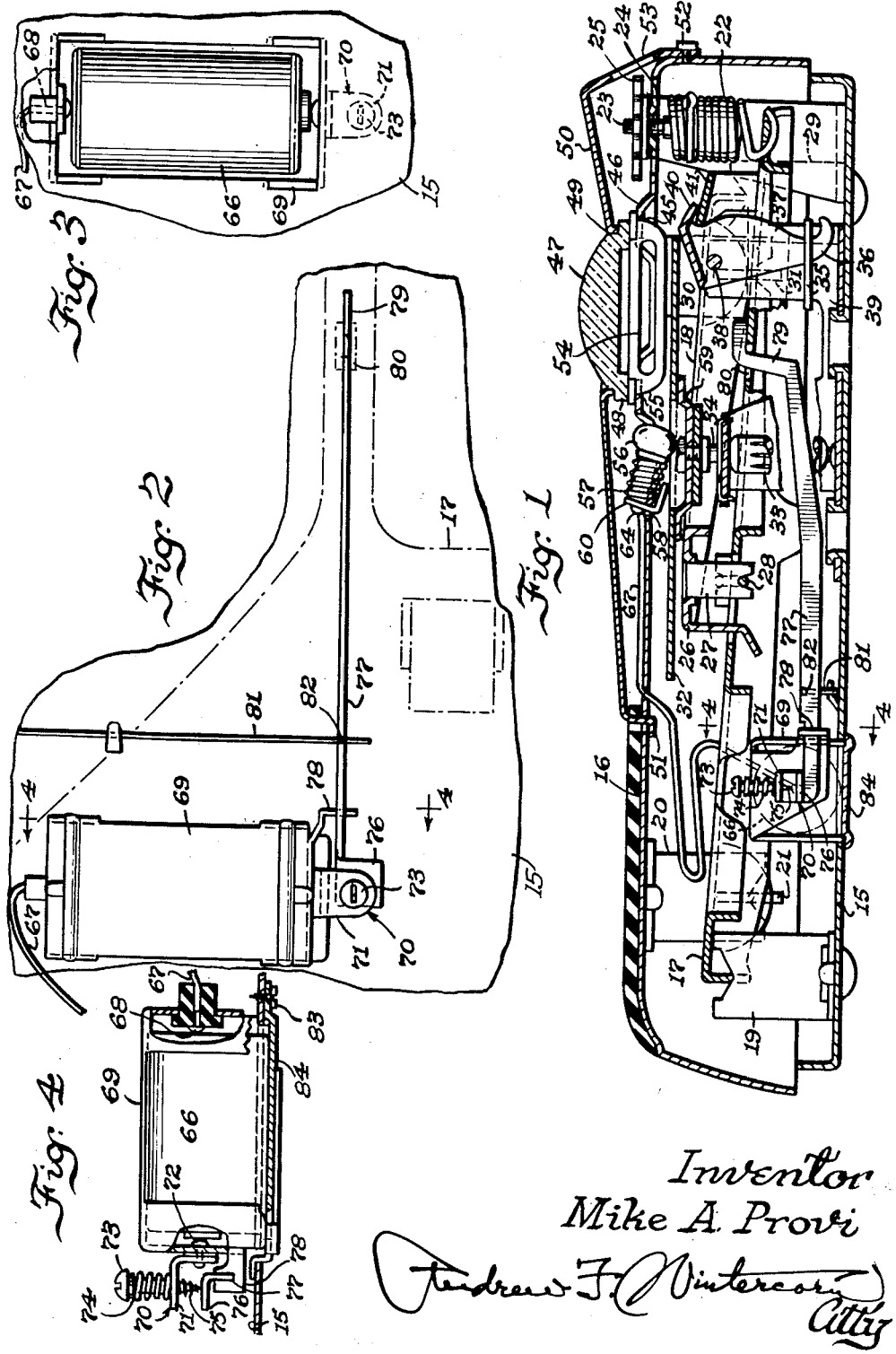
Inventor
Mike A. Provi

United States Patent Office 2,812,422
Patented Nov. 5, 1957

2,812,422
ILLUMINATED BATHROOM SCALE

Mike A. Provi, Rockford, Ill., assignor to The Brearley Company, Rockford, Ill., a corporation of Illinois Original application December 28, 1953, Serial No. 400,566. Divided and this application March 2, 1955, Serial No. 491,602

11 Claims. (Cl. 240—2.11)

This application is a division of my copending application, Serial No. 400,566, filed December 28, 1953.

This invention relates to bathroom scales and is more particularly concerned with one having an electric light built in to illuminate the dial and thus facilitate reading the indicated weight, the light being automatically turned on only when the platform is depressed.

It is the principal object of my invention to provide an improved switch construction for automatically turning the light on when the platform is depressed. In accordance with my invention an elongated switch lever that is pivoted near one end to the battery housing and has its other end movable downwardly, partly by gravity and partly by light spring pressure, with the main wishbone lever when the scale platform is depressed, has a lug on the pivoted end serving as a movable contact that is arranged to engage the end of a fixed contact that is in the form of an adjustable screw mounted on a bracket on the battery housing in insulated relationship thereto, the screw having a coiled compression spring surrounding the shank thereof under the head so as to maintain it under sufficient spring pressure so that when it is once adjusted at the factory when the scale is being assembled there, it is not apt to ever require any further adjustment later. This lever combination, incidentally, works so easily and with such light pressure on the wishbone lever that no perceptible inaccuracy is introduced thereby into the weighing operation.

The invention is illustrated in the accompanying drawing, in which—

Fig. 1 is a longitudinal section through a bathroom scale incorporating the improved light switch of my invention;

Fig. 2 is a plan view of the switch and battery housing on a larger scale, and approximately full size;

Fig. 3 is a bottom view of Fig. 2 with the cover plate removed indicating the accessibility of the battery through the opening in the base plate for easy removal and replacement of the battery, and Fig. 4 is a view on the line 4—4 of Figs. 1 and 2.

The same reference numerals are applied to corresponding parts throughout the views.

Referring first mainly to Fig. 1, the reference numeral 15 designates the generally rectangular sheet metal base of the scale, and 16 the generally rectangular sheet metal platform supported on said base by means of a pair of wishbone levers 17 and 18. The latter are made in accordance with the disclosure in my Patent No. 2,668,045, issued February 2, 1954. The main wishbone lever 17 is generally triangular shaped and fulcrumed at the base portion of the triangle on a pair of brackets 19 extending upwardly from the rear portion of the base 15, and this lever supports the rear portion of the platform 16 by means of a pair of downwardly projecting brackets 20 that engage at their lower ends in hangers 21 fulcrumed on the lever 17 in forwardly spaced relation to the brackets 19. At the front end of the scale the lever 17 is connected to the lower end of the weighing spring 22 that is suspended by means of a screw 23 in the upper end of an inverted U-shaped bracket 24 supported on the base 15, an adjusting nut 25 being threaded on the screw 23 and resting on top of the bracket 24 to provide an adjustable support for the screw on the bracket and thus enable adjusting the scale back to zero in the well-known way. The other and smaller lever 18 is wishbone or U-shaped and has its cross-portion 26 supported on top of the main lever 17 by means of a downwardly projecting lug 27 which engages a hanger 28 supported on lever 17, the lever 18 having its arms supported on the front end of base 15 on brackets 29 and serving to support thereon the front end portion of the platform 16 by means of downwardly projecting brackets 30 that engage in hangers 31 supported on the arms of the lever 18 in rearwardly spaced relation to the brackets 29.

The weight indicating dial 32 is connected with a pinion 33 by means of a spindle 34 suitably formed integral with the pinion. A rack 35 meshes with the pinion 33 and is pivotally connected at its forward end to the lower end of an arm 36 of a bell-crank lever 37 pivoted by means of a cross-pin 38 to a bracket 39 supported on the base 15. This bell-crank lever 37 has a finger 40 resting on an arch 41 carried on the front end portion of the lever 17 immediately behind the spring 22, so that when the lever 17 is depressed by weight applied to the platform 16 the bell-crank lever 37 will swing in a clockwise direction as viewed in Fig. 1 under the action of a light coiled tension spring (not shown) that is connected to the rear end of the rack 35 and has its rear end attached to a lug (not shown) extending upwardly from the base 15. The heavier the weight the more the levers 17 and 18 are depressed against resistance of the weighing spring 22 and the farther the rack 35 is moved under action of its spring to turn the dial 32 away from its zero position, all as clearly disclosed in my copending application, Serial No. 330,824, filed January 12, 1953.

As further disclosed in the last-mentioned copending application, the dial 32 has graduations annularly of the top thereof, and a sight opening 45 is provided in a circular upwardly embossed portion 46 of the platform 16 over the front half portion of the dial so that a reading may be taken of the indicated weight by a person standing on the platform. A magnification lens 47 gives sufficient enlargement so that the figures and graduation lines are easily seen from eye level above the platform, especially when the dial 32 is illuminated, as hereinafter described. The lens 47 has a rim portion 48 resting on top of the embossed portion 46 of the platform and fits in a circular hole 49 provided therefor in an escutcheon plate 50 that is suitably secured to the platform 16, as by means of a lug 51 on the rear end of the plate and a screw 52 at the front end of the plate. A slot 53 in the front end of the plate 50 affords access therethrough to the rim portion of the nut 25 previously mentioned in setting the scale back to zero. A double hairline member 54 is set in slots 55 provided in the platform 16 on diametrically opposite sides of the sight opening 45 and is held in place on the embossed portion 46 of the platform by the rim portion 48 of the lens. The upper hairline portion of the member 54 is in closely spaced relation to the bottom of the lens, and the lower hairline portion of member 54 is in closely spaced relation to the dial 32, and the two portions together determine the vertical plane of sight for accurate reading of the indicated weight, as described in said last mentioned copending application.

A small electric light bulb 56 is mounted in a socket 57 disposed in an opening 58 provided in the platform 16 immediately behind the upwardly embossed portion 46 on which the lens 47 is supported, the socket 57 being disposed on the longitudinal center line of the platform, and having a downward and forward inclination in the opening 58 so as to direct the light on a line forwardly and downwardly across the top of the dial 32 in the fore and aft vertical plane of the double hairline member 54, so that there will be no shadows cast by any portion of this hairline member and the light will be concentrated on the dial for easier reading of the indicated weight. The dial 32, it will be noticed, has a recessed central hub portion 59, and the bulb 56 is disposed over this hub and projects to some extent into the recess, especially when the platform 16 is depressed under weight. The arrangement, therefore, enables substantially the same close spacing of the platform 16 in relation to the dial 32 as when no light bulb was provided, without danger of any interference by reason of insufficient clearance. The socket 57 for the bulb is mounted on a small sheet metal bracket 60 that is fastened to the platform 16, the back wall of the socket being fastened to the bracket in insulated relationship thereto by a hollow rivet 64, whereby to provide an insulated terminal in the socket for engagement by the terminal on the tip of the screw plug end of the bulb connected to one end of the filament in the well known manner, the other end of the filament being connected to the screw plug on the bulb that threads in the socket 57, thereby grounding one side of the filament through bracket 60 on the metal platform 16 of the scale and through its metal contacts with the base 15 on the base 15, to which the shell of the battery 66 is also grounded, as will soon appear. A conductor wire 67 has a stripped end portion soldered in the hollow rivet 64 and this wire extends to and is connected with an insulated terminal 68 provided on the battery retaining housing 69 that is grounded to the base 15, so that a circuit will be completed through bulb 56 from the battery 66 when a switch indicated generally by the reference numeral 70 is closed, this switch being automatically closed when a sufficient load is placed on the platform 16 to cause the supporting levers 17 and 18 to be depressed.

The switch 70 forms the subject matter of my present invention and includes a bracket 71 that is mounted on one end of the skeleton box-like housing 69 in insulated relationship thereto by means of a rivet 72 that serves as a terminal and has contact with the central post or terminal of the battery 66, as clearly appears in Fig. 4. A screw 73 threaded in a hole in the bracket 71 has a coiled compression spring 74 surrounding the shank thereof under the head of the screw and compressed between the head and the bracket 71 to hold the screw under tension in adjusted position. The protruding end 75 of the screw, therefore, serves as an adjustably fixed contact which, when engaged by the movable contact 76 provided in the form of an outwardly bent lug on one end of an elongated switch lever 77, engages contact 75 and causes the light bulb 56 to be turned on. The lever 77 is fulcrumed intermediate its ends in the forked portion of a lug 78 projecting from and forming a part of one end wall of the housing 69. This lever 77 has an upwardly projecting hooked front end 79 extending through a slot 80 provided in the front end portion of the lever 17 and engaging the top of said lever so that the lever 77 will swing downwardly with the lever 17 partly under gravity and partly under the light pressure of a wire spring 81 that is suitably fixed at two points along its length to the base 15 and has its free end portion engaging in a notch 82 provided in the upper edge of the lever 77, as clearly appears in Fig. 1. The screw 73 is carefully adjusted at the factory when the scale is assembled to provide a predetermined clearance between the end 75 of the screw and the lug 76 so that a predetermined movement of lever 17 is required to close the contacts 75 and 76 and complete a circuit through bulb 56. In that way there is no danger of the light being turned on accidentally and causing the battery 66 to be worn out prematurely, and yet at the same time the operation is sufficiently positive to insure turning on of the light each time the scale is used in weighing a person standing on the platform. Elongating the lever 77 to the extent shown and operating its free end by connection with the lever 17 near its front end and adding the light spring pressure at 81 makes the operation so easy that there is no perceptible effect one way or the other on the accuracy of weighing. Also, this arrangement insures having the hooked end 79 of the lever 77 in the closed circuit position of the lever standing in upwardly spaced relation to lever 17 in a weighing operation, because the lever 17 is depressed farther than the lever 77 has to come down in order to close contacts 75 and 76. This is important because of the appreciable weight of lever 77 in addition to the pressure of the light spring 81, as these together would otherwise constitute a small factor affecting accuracy of weighing.

The light bulb 56 may be easily removed and replaced by removing only a single screw 52 so that the escutcheon plate 50 can be removed and the bulb 56 made accessible for removal and replacement. In like manner, it is only necessary to remove a single screw 83 in order to permit removal of a cover plate 84 closing an opening 85 in the base 15, in order to expose the battery 66 for removal and replacement, the battery 66 being then easily accessible as indicated in Fig. 3 and free to be dropped out when the scale is turned over.

I claim:

1. In a switch for a weighing scale having an electric light bulb for illumination of the weight indicating dial, the scale including a platform, a base, weight indicating dial means and weight indicator means movable relative to one another, and spring restrained lever mechanism supporting said platform on said base and operatively connected with the movable one of the last named means to move the same when said lever mechanism is depressed in a weighing operation, said switch being mounted on said base for electrically connecting the light bulb with a source of electric current supply, said switch comprising a fixed contact and a relatively movable contact, the movable contact being carried on one end of an elongated arm that is pivotally mounted with respect to said base intermediate the ends of said arm near said movable contact, whereby said arm is unbalanced and tends to gravitate towards closed circuit position, the free end of the said arm opposite the contact end being supported by and tending to move downwardly with said lever mechanism in the depression thereof by the platform in a weighing operation.

2. A weighing scale switch structure as set forth in claim 1 including spring means exerting light pressure on said arm to assist gravitation thereof toward closed circuit position whereby to insure closing of the contacts each time a weighing operation occurs.

3. A weighing scale switch structure as set forth in claim 1 wherein the stationary contact comprises an adjustable screw threaded in a support for adjustment toward and away from the movable contact, and spring means exerting light pressure on said arm to assist gravitation thereof toward engagement with said screw.

4. In a weighing scale having an electric light bulb for illumination of the weight indicating dial, the scale including a platform, a base, weight indicating dial means and weight indicator means movable relative to one another, and spring restrained lever mechanism supporting said platform on said base and operatively connected with the movable one of the last named means to move the same when said lever mechanism is depressed in a weighing operation, a battery housing mounted on said base and enclosing a battery therein, one terminal of which is permanently connected electrically with said electric light bulb, and a switch carried on said housing including a fixed contact and a relatively movable contact, said fixed contact being electrically connected with the other terminal of said battery in insulated relation to said housing, and said movable contact being carried on one end of an elongated switch lever pivotally supported on said housing intermediate the ends of said lever and near the end carrying said movable contact, whereby said arm is unbalanced and tends to gravitate toward closed circuit position, the free end of the said arm opposite the contact end being supported by and tending to move downwardly with said lever mechanism in the depression thereof by the platform in a weighing operation.

5. A weighing scale structure as set forth in claim 4 including spring means exerting light pressure on said arm to assist gravitation thereof toward closed circuit position whereby to insure closing of the contacts each time a weighing operation occurs.

6. A weighing scale structure as set forth in claim 4 wherein the stationary contact comprises an adjustable screw threaded in a support for adjustment toward and away from the movable contact, and spring means exerting light pressure on said arm to assist gravitation thereof toward engagement with said screw.

7. A weighing scale structure as set forth in claim 4 wherein said base has an opening provided therein communicating with said housing, whereby the battery in said housing may be removed and replaced from outside the scale, and a cover plate closing said opening and removably secured to said base.

8. In a weighing scale comprising a base, a platform, an elongated lever fulcrumed at one end on said base and having said platform resting thereon for support near the fulcrumed end, and spring means supporting the other end of said lever yieldably on said base, a switch mounted on said base near the fulcrumed end of said lever for electrically connecting a light bulb with a source of electric current supply, said switch comprising a fixed contact and a relatively movable contact, and an elongated switch operating arm extending lengthwise relative to said lever pivotally mounted near its one end with respect to said base and having its pivoted end portion arranged to operate the movable contact, said arm being unbalanced and tending to gravitate toward closed position, the free end portion of said arm extending away from said fulcrum and being supported at its extremity by and tending to move downwardly with said lever in the depression thereof by the platform in a weighing operation.

9. A weighing scale as set forth in claim 8, including spring means tending to swing said arm toward closed circuit position.

10. A weighing scale as set forth in claim 8, wherein the stationary contact comprises an adjustable screw threaded in a support for adjustment toward and away from the movable contact.

11. A weighing scale as set forth in claim 8, wherein the stationary contact comprises an adjustable screw threaded in a support for adjustment toward and away from the movable contact, said screw having a head on the adjusting end thereof, and a coiled compression spring surrounding said screw and compressed between the head thereof and said support whereby to maintain said screw under endwise pressure resiliently and thereby hold the same in adjusted position.

References Cited in the file of this patent

UNITED STATES PATENTS

| | | |
|---|---|---|
| 1,030,879 | Emanuel | July 2, 1912 |
| 1,068,504 | King | July 29, 1913 |
| 1,993,678 | Morgan | Mar. 5, 1935 |
| 2,482,540 | Furnas et al. | Sept. 20, 1949 |